Sept. 10, 1935.　　　A. N. EMMONS　　　2,014,229
PORTABLE SLAB CUTTING MACHINE
Filed July 8, 1933　　　3 Sheets-Sheet 1

INVENTOR:
Arthur N. Emmons
BY
Bodell & Thompson
ATTORNEYS.

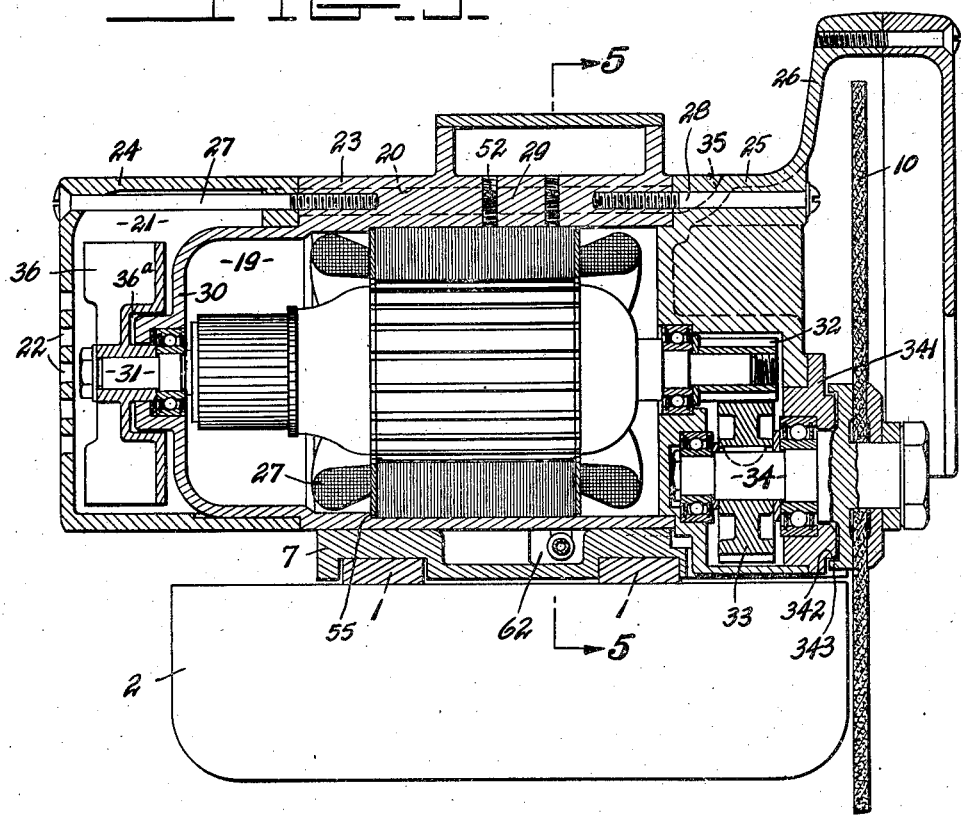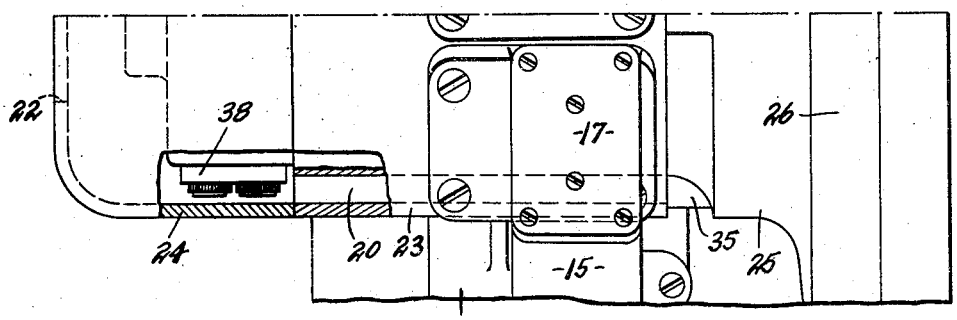

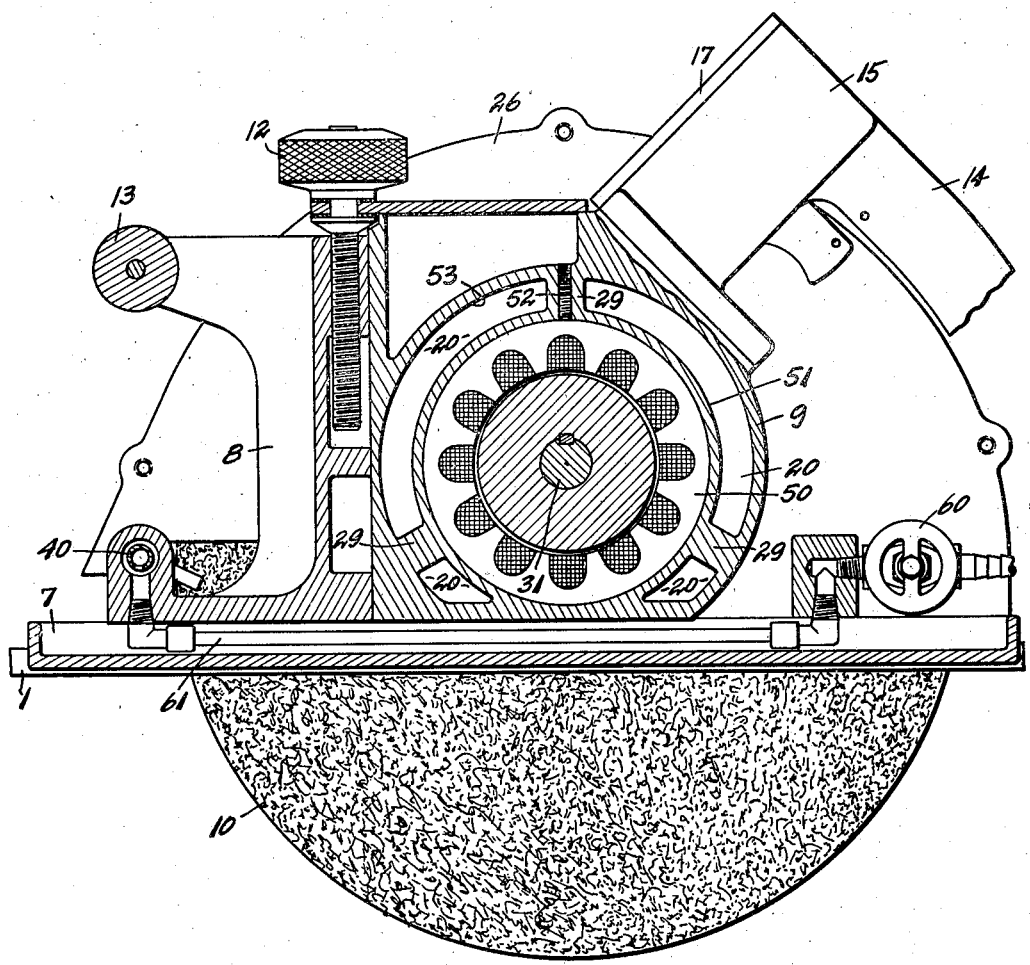

Patented Sept. 10, 1935

2,014,229

UNITED STATES PATENT OFFICE 2,014,229

PORTABLE SLAB CUTTING MACHINE

Arthur N. Emmons, Syracuse, N. Y., assignor to The Porter-Cable Machine Company, Inc., Syracuse, N. Y., a corporation of New York Application July 8, 1933, Serial No. 679,557

5 Claims. (Cl. 125—13)

This invention relates to portable, electric-motor operated, machine tools, and has for its object a particularly simple, economical and compact arrangement of the electric motor and cooling means therefor, whereby the motor is cooled by air without outside dust laden air coming in contact therewith, and although applicable to motor operated tools generally is particularly adapted to a tool for cutting slabs of stone, marble, steel, glass etc., which creates dust of hard cutting particles. It further has for its object a machine movable along a track having means for clamping it onto the slab in any position to locate the cutting tool to cut along a desired path or means for applying a track to a slab and locating it in any desired position on the slab.

It further has for its object a particularly simple and efficient arrangement of cooling means for the cutter.

The invention consists in the novel features and in the combinations and constructions hereinafter set forth and claimed.

I have illustrated my invention as embodied in a tool for cutting stone, marble, glass etc., having a cutting disk, usually of carborundum, and in describing it, reference is had to the accompanying drawings in which like characters designate corresponding parts in all the views.

Figure 3 is an enlarged vertical sectional view on line 3—3, Figure 2.

Figure 4 is a fragmentary plan view partly in section.

Figure 5 is a vertical sectional view of the machine taken on the plane of line 5—5, Figure 3.

Figure 1:
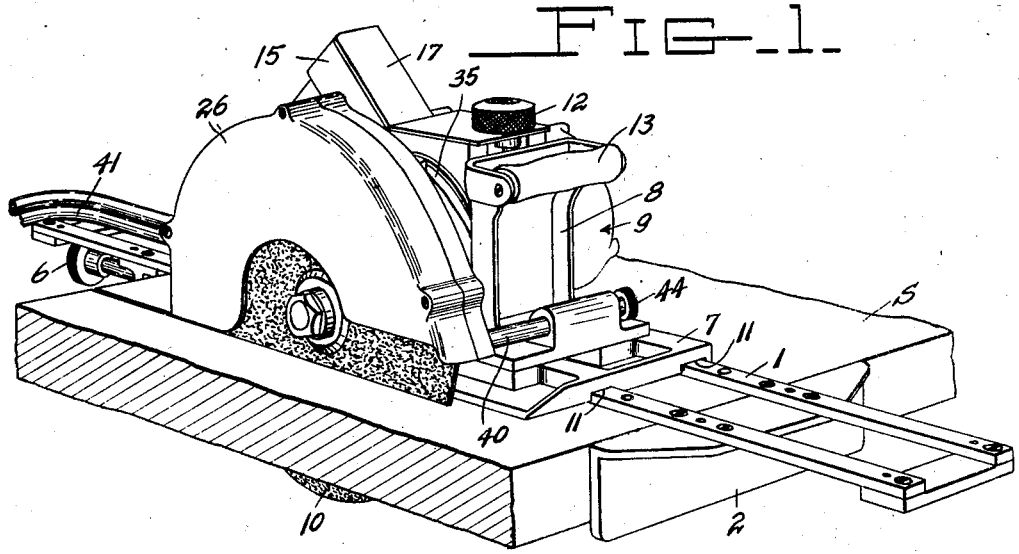
Figure 1 is a perspective view of this portable slab cutting machine showing the same applied to a slab.
Figure 2:
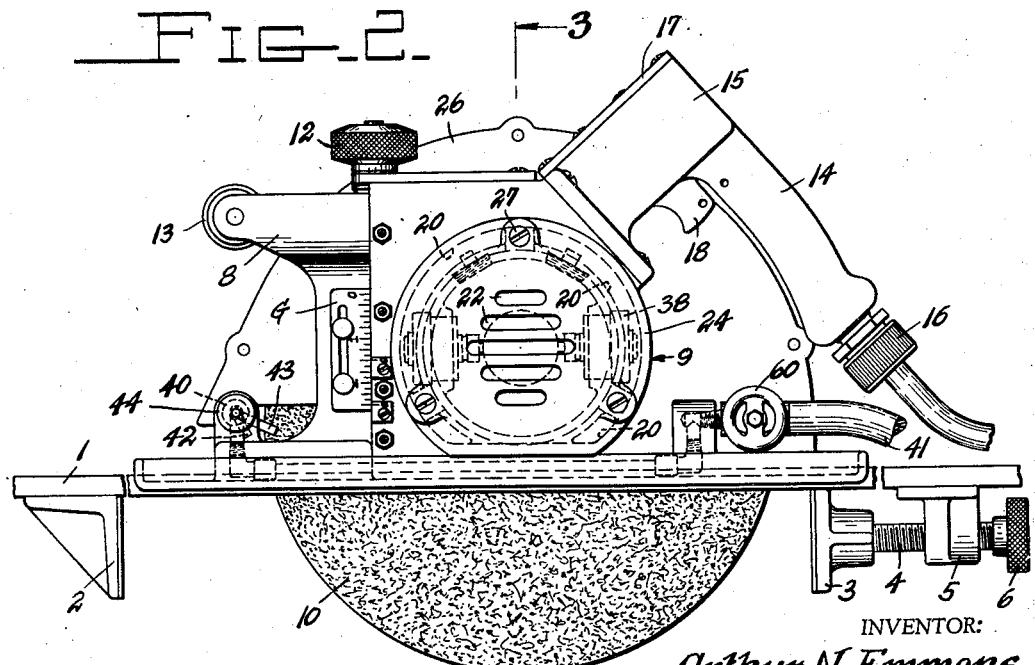
Figure 2 is a side elevation of parts seen in Figure 1.

I designates tracks or guides having means for securing them to the slab S to be cut, the means here illustrated being opposing jaws 2 and 3 depending from the track, one jaw as 2 being adjustably fixed and the opposing jaw 3 being adjustable and carried by an adjusting or operating screw 4 threading in a lug 5 depending from the track and having a head or handle 6 at its outer end. The lug 5 is also adjustable along the track or guide I to accommodate different widths of slabs to be cut. The jaws are located on and depend from the under side of the track to permit movement of the tool or body along the track at both ends thereof sufficiently for the cutter to clear the slab or to cut from one edge of the slab entirely through the other edge.

The body of the tool comprises a base plate 7 movable along the track, a bracket 8 fixed to the base plate and a housing 9 mounted on the bracket and carrying a cutter 10 and the motor for actuating the cutter. The base plate 7 is provided with suitable ways or guides 11 coacting with the track, and the housing 9 is adjustable vertically of the bracket 8 toward and from the base plate to regulate the depth of the cut. As here shown, it is so adjusted by means of a screw 10 threading vertically into the bracket and secured at its upper end against endwise movement to the housing and having a handle or head 12 at its upper end. The bracket 8 and the housing 9 are provided with complemental V ways. By turning the screw in one direction or the other, the housing 9 will be elevated or lowered relatively to the base plate, and hence, elevate or lower the cutter. A gage G is provided to indicate the adjustment. This adjusting feature per se forms no part of the invention. The bracket is formed with a suitable handle 13, and the housing with a handle 14, the handles 13, 14 being located substantially over the track. The handle 14 is shown as inclined downwardly and rearwardly and carrying a switch box 15 at its upper end in which the switch for controlling the flow of current to the electric motor is located. The handle has a suitable coupling 16 at its lower end for electric wires connected to the switch, which wires extend through the handle 14. The switch box is provided with a removable cover plate 17. The switch is operated by means of an operating lever, as a trigger 18, extending through the lower side of the switch box, where it can be operated by a finger of the hand grasping the handle 14.

The housing 9 extends transversely of the tracks and the base plate, that is, its major dimension or axis extends crosswise of the base plate and the tracks. The housing 9 is formed with an entirely closed chamber 19 in which the motor is located. The body, as here shown, comprises generally three sections, an intermediate section 23, and end sections 24, 25. The intermediate section 23 and the end section 25 form the enclosed chamber 19 for the motor. The intermediate section 23 is formed with concentric spaced apart walls. The inner wall extends at one end beyond the outer wall and forms a tub or end shield for the motor housing. The section 25 abuts against the opposite end of the intermediate section 23 and forms the opposite end wall for the housing 19. The rotor shaft of the motor is journaled in suitable antifriction bearings located in these end walls of the housing 19. The section 24 is formed substantially concentric with the end wall 30 and so spaced relatively to the same that it forms the fan housing 21, the fan 36 being secured to the outer end of the armature shaft 31 between the end wall 30 and the end wall of the section 24 which is provided with openings 22 for the admission of air to the fan chamber 21. The inner and outer concentric walls 51, 53 of the section 23 provide passages 20 which open at one end into the fan housing 21 and opening at their other ends through the section 25 to the outer atmosphere.

These passages 20 are separated from each other by ribs 29, the outer wall 53 merging into the inner wall at the bottom of the housing adjacent the base plate. This is done to reduce the distance between the center of the arbor 34 to the track or guide 1 so that the maximum depth of cut can be obtained with a given size cutter. The end sections 24, 25 are secured to the ends of the intermediate section by any suitable means, as here shown with screw bolts 27, 28 which thread into the ribs 29.

It will be observed when the end section 25 is secured in place on the end of the intermediate section 23, the motor chamber 19 is cooled by the circulation of air through the passages 20 which does not in any manner come in contact with the rotor, fields, and associated parts of the motor. This is a very important feature when the tools are used for cutting hard gritty substances, such as stone, marble, granite, etc., as the dust from such cutting operations is very injurious to the motor parts. Also, as will be hereinafter explained, the machine is provided with means for supplying a stream of cooling fluid to the cutter and this transforms the dust into a paste which collects and sticks into the motor parts causing great damage thereto.

The bore of the inner wall 51 is such that the field 50 of the motor fits snugly thereinto and is secured in a suitable manner, as by means of the set screws 52. The bore of the wall 51 is provided at its end next to the wall 30 with a shoulder 55 against which the field of the motor is located. It is understood that the field of the motor carries the field coils 27 which are connected to the source of current to the switch located in the switch housing 15.

The end section 25 is provided with a reduced cylindrical portion which fits snugly into the bore of the wall 51 and is further provided with a shoulder which abuts against the end of the intermediate section 23.

The fan is formed with an annular recess 36ª which receives the hub portion of the wall 30 in which the outer bearing for the armature shaft is mounted. This construction seals the bearing and the motor compartment 19 against dust and moisture.

By the construction just described, I effect ample cooling of the motor without any of the outside air which may be dust laden from coming in contact with the motor. The heat generated in the field and the armature of the motor is radially dissipated into the inner wall 51 which, as heretofore stated, snugly engages the field of the motor, it forming an efficient thermal joint between these two members. The heat from the inner wall 50 is radially dissipated by the air streams passing through the passage 20.

In the preferred embodiment of my invention, as shown, the intermediate section 23 comprises a one piece casting which requires simple machining operations, particularly in view of the fact that substantially all of the surfaces thereof are formed concentric with the armature shaft of the motor. This construction aids greatly in reducing the manufacturing and assembling cost of the tool and at the same time provides a maximum of rigidity and extreme cooling efficiency coupled with extreme long wear of the motor and other bearings.

The motor shaft 31 extends lengthwise of the housing or crosswise of the tracks, and in the illustrated embodiment of my invention, the motion of the motor shaft 31 is transferred to the cutter through reduction gearing, as the gear 32 mounted on the motor shaft and meshing with a gear 33 mounted on the axle 34 of the cutter 10, the axle 34 being mounted in suitable sealed antifriction bearings, as is also the motor shaft 31. The outer bearing for the axle 34 is mounted in a cap 341 and the cap interfits at 342 with a flange 343 on the axle 34 against which the cutter disk is clamped. This construction seals the motor chamber against the inlet of dust. The section 25 abuts against the end of the intermediate section 23 and the passages 20 open into the outer air at 35 at the abutting ends of the intermediate section 23 and the end section 25.

The portion of the chamber 19 closed by the wall 30 encloses the commutators and brushes of the motor and suitable brush holders, as 38, are mounted in opposite sides of the wall 30 and the outer ends of the brush holders 38 are located in the air draft created by the fan 36 into passages 20.

The cutter is of any suitable material, as a carborundum composition, and it is cooled by cooling means carried by the base, this consisting of a conduit 40 for a cooling medium, as water, the conduit being mounted in the bracket 8 and extending transversely of the tracks. It is suitably coupled to a hose 41 to a water supply and has angular nozzles 42, 43 at its other end arranged to discharge against the edge and margins of the cutter, there being three nozzles located to discharge against the opposite marginal faces and the cutting edge of the cutter. A valve 60 is located beneath the handle 14 of the machine to provide a convenient means of regulating the supply of cooling medium through the nozzles 42, 43. The valve 60 is connected to the conduit 40 through the conduit 61 which is located in a recess 62 formed in the base plate 7 between the guides 1. Hence, the tool has self contained therewith, or a unit therewith, means for cooling the motor and means for cooling the cutter.

In operation, the track is applied to the slab by means of clamps 2, 3 and to any desired position on the slab determined by the line along which the slab is to be cut. The body with the base plate 7 is then applied to one of the extreme ends of the track so that the cutter 10 clears the slab. The body is then held by means of the handles 13, 14 and the motor started by operating the trigger 18. The body is then moved along the track, moving the cutter into the work and is pushed along the track to feed the cutter into the work. It is to be noted that the base plate 7 is provided with parallel recesses which receive the guides or track 1, and that the machine is readily removable from the guides or track at any point along the same. During the cutting operation, the valve in the water pipe is opened by means of its handle to open the conduit to the water, and water is projected into jets against the margin and edge of the cutter to cool the same. The motor is automatically cooled by the fan 16 creating an ample air draft through the passages 20.

Although portable tools, as wood saws, have been adapted for cutting hardened slabs, nevertheless, they do not work satisfactorily, as the operator must guide the tool along a line and such tools are a make-shift for the intended purpose, and do not operate satisfactorily.

My cutter is especially designed for cutting hardened slabs and is particularly advantageous in that it provides a track which may be applied to the work so that the operator does not have to guide the cutter along a line, and further in that it is particularly simple and compact in arrangement of its parts and the motor adequately cooled in a particularly simple manner without adding complications to the structure.

What I claim is:

1. In a portable power operated stone cutting tool, comprising a track, means for detachably securing the track to the surface of the stone being cut, a body slidably mounted on the track and guided thereby and including a motor housing extending transversely of the track and being closed at one end, an end section detachably secured to the opposite end of the motor housing, a motor mounted in the housing, a cutter arbor journalled in said end section, a cutter mounted upon the arbor and depending below said track, the body being provided with means for directing a stream of cooling liquid on the cutter, motion transmitting means between the motor shaft and the cutter arbor, said means being located in the detachable end section, and means for cooling the periphery of the motor housing.

2. A portable power operated stone cutting tool, including a track for supporting and guiding the tool, a body including a base portion slidably mounted upon said track, a housing carried by the base portion and being adjustable toward and from the track, said housing comprising a tubular section closed at one end and having lengthwise extending passages in its periphery, an end section secured to the open end of the tubular section and hermetically sealing the same, a cutter arbor mounted on said end section, a motor mounted in the tubular section, and motion transmitting means arranged in said end section between the motor shaft and the cutter arbor, said base portion including a nozzle for directing a cooling medium on the cutter, and means for directing a flow of air through the passages in the tubular section to dissipate the heat generated by the motor.

3. A portable power operated stone cutting tool comprising a guide track, means for detachably securing the track to the surface of the stone being cut, a base slidably mounted on the track, a housing carried by the base comprising an intermediate section hermetically sealed by end sections, a motor mounted in the intermediate section, a cutter arbor journalled in one end section, a cutter mounted on the arbor and depending below the track, means caried by the base for directing a stream of liquid cooling medium on the cutter, means for conducting heat generated by the motor from the periphery of the intermediate section, and motion transmitting means between the motor shaft and the cutter arbor.

4. A portable, power operated, stone cutting tool comprising a base, a housing mounted on the base and being formed with an intermediate section closed at one end, an end section closing the open end of the intermediate section and having a cutter arbor journalled therein, a cutter mounted upon said arbor, and said end section having a guard surrounding the upper exposed portion of the cutter, means located adjacent the guard for directing a stream of liquid cooling medium on the cutter, and motion transmitting means arranged in said end section and connecting the motor shaft and the cutter arbor.

5. A portable power operated stone cutting tool including a guide track, and means for detachably securing the guide track to the surface of the stone being cut, a base slidably mounted upon the track, a housing carried by the base and extending transversely of the track including a tubular section having spaced apart inner and outer walls, one end of said section being a continuation of the inner wall, an end section detachably secured to the open end of the intermediate section and hermetically sealing the same and being formed with a cutter guard, a cutter arbor journalled in said detachable end section, and a cutter carried on the arbor beneath the guard, means arranged adjacent the guard for directing a stream of cooling medium on the cutter, a motor mounted in the hermetically sealed intermediate section, motion transmitting means between the motor shaft and the cutter arbor, and means for circulating a flow of air between the inner and outer walls of the intermediate section when the tool is in operation.

ARTHUR N. EMMONS.